(12) United States Patent
Grimm et al.

(10) Patent No.: US 8,567,859 B2
(45) Date of Patent: Oct. 29, 2013

(54) SLIDING ROOF SYSTEM, IN PARTICULAR FOR MOTOR VEHICLES

(75) Inventors: Rainer Grimm, Frankfurt (DE); Juergen Schrader, Weil im Schoenbuch (DE); Achim Demmer, Magstadt (DE)

(73) Assignee: Roof Systems Germany GmbH (DE)

(*) Notice: Subject to any disclaimer, the term of this patent is extended or adjusted under 35 U.S.C. 154(b) by 0 days.

(21) Appl. No.: 13/417,901

(22) Filed: Mar. 12, 2012

(65) Prior Publication Data

US 2012/0235448 A1    Sep. 20, 2012

(30) Foreign Application Priority Data

Mar. 14, 2011  (DE) .......................... 10 2011 013 826

(51) Int. Cl.
*B60J 7/047* (2006.01)
(52) U.S. Cl.
USPC ................................ 296/216.03; 296/216.05
(58) Field of Classification Search
USPC ....................................... 296/216.02–216.05
See application file for complete search history.

(56) References Cited

U.S. PATENT DOCUMENTS

| | | | | |
|---|---|---|---|---|
| 4,407,541 A * | 10/1983 | Boots | ....................... | 296/216.03 |
| 4,678,228 A * | 7/1987 | Boots | ....................... | 296/216.03 |
| 5,058,947 A * | 10/1991 | Huyer | ....................... | 296/216.03 |
| 7,784,859 B2 * | 8/2010 | Grimm et al. | ................. | 296/223 |
| 2009/0160223 A1 | 6/2009 | Grimm et al. | | |

FOREIGN PATENT DOCUMENTS

DE    102008017526 B3    9/2009
EP      2 072 304 A1    12/2008

OTHER PUBLICATIONS

DE102008017526 English Abstract.

* cited by examiner

*Primary Examiner* — Dennis Pedder
(74) *Attorney, Agent, or Firm* — Cantor Colburn LLP

(57) ABSTRACT

A sliding roof system, in particular for motor vehicles, with at least one guide rail, a carriage which is shiftable in the guide rail, a guide element located at the front, which can cooperate with a cover of the sliding roof, and a swing-out lever located at the rear, which likewise can cooperate with the cover and can be moved by the carriage from a starting position into a position swung out, is wherein the swing-out lever is mounted on the guide rail with a fixed swivel axis and that at least in the starting position the end of the swing-out lever associated to the cover lies on the side of the swivel axis facing the carriage.

12 Claims, 9 Drawing Sheets

Prior Art  Fig. 1

SLIDING ROOF SYSTEM, IN PARTICULAR FOR MOTOR VEHICLES

CROSS REFERENCE TO RELATED APPLICATIONS

This application claims priority to German Patent Application No. DE 10 2011 013 826.9 filed Mar. 14, 2011, under 35 U.S.C.§119, the contents of which are incorporated herein by reference thereto.

BACKGROUND

This invention relates to a sliding roof system, in particular for motor vehicles, with at least one guide rail, a carriage which is shiftable in the guide rail, a guide element located at the front, which can cooperate with a cover of the sliding roof, and a swing-out lever which likewise can cooperate with the cover and can be moved by the carriage from a starting position into a position swung out.

Such a sliding roof system is known from U.S. Pat. No. 7,784,859, the contents of which are incorporated herein by reference thereto and will be explained below with reference to FIGS. 1 to 4. The sliding roof system serves to shift a cover 10 (see FIG. 2) from a closed position, in which it closes an opening in a vehicle roof, via various intermediate positions (for example a ventilator position) into an open position, in which the opening in the vehicle roof substantially is cleared. On the cover 10 a cover holder 12 is mounted, which is shiftably coupled with a guide rail 14 via various components of a swing-out mechanism. In practice, two guide rails 14 and correspondingly two cover holders 12 usually are employed, which both extend parallel to the direction of travel of the vehicle substantially on the left and on the right side of the cover or the roof opening.

For adjusting the cover holder 12 and hence the cover 10 a carriage 16 is provided, which is shiftably mounted in the guide rail and can be shifted along the guide rail by a drive motor (not shown) via a likewise non-illustrated drive cable. In the starting position or closed position of the cover 10, which is shown in FIG. 2, the carriage 16 is in a front position (relative to the longitudinal direction of the vehicle), in which it ensures that both a guide element 18 located at the front and a swing-out lever 20 located at the rear are in a lowered position or starting position. When the carriage is shifted to the rear starting from the front position, the swing-out lever 20 on the one hand is shifted to the rear via a swing-out rod 22. As a result, the swing-out lever 20 is shifted relative to a bearing block 24 with which it is coupled by a swing-out coulisse 26. As a result, the rear end of the swing-out lever 20 coupled with the cover holder 12 is swung out to the top (cf. FIGS. 2 and 3). In addition, the guide element 18 located at the front is lifted, which likewise can easily be seen by a comparison of FIGS. 2 and 3.

At a certain point of the movement to the rear, namely when the swing-out lever 20 has completely been moved to the outside, the carriage 16 is detached from the swing-out rod 22, wherein at the same time the front end of the swing-out rod 22 is stationarily fixed in the guide rail 14 by a latch mechanism 28. Subsequently, the carriage 16 is moved further to the rear, wherein the guide element 18 located at the front is carried along. As a result, the cover holder 12 is shifted relative to the upper end of the swing-out lever 20, so that in a position with completely open cover, as it is shown in FIG. 4, the guide element 18 located at the front is disposed relatively close to the swing-out lever 20 located at the rear.

To provide for the carriage 16 being moved far to the rear together with the guide element 18 for the cover holder 12 located at the front, it is necessary in the prior art to arrange the swing-out lever 20 beside the guideway for the carriage 16 (see FIG. 1, in which the guideway for the carriage 16 is designated with the reference numeral 30). This results in a great overall width of the swing-out mechanism and the guide rail.

The object of the invention consists in developing a sliding roof system as mentioned above to the effect that a more compact construction is obtained in transverse direction. Accordingly, it is desirable to provide a sliding roof system with a compact construction in the transverse direction.

SUMMARY

For the solution of one embodiment of the present invention the swing-out lever is mounted on the guide rail with a fixed swivel axis and that at least in the starting position the end of the swing-out lever associated to the cover lies on the side of the swivel axis facing the carriage. This embodiment is based on the fundamental idea to arrange the swing-out lever such that in the starting position it is oriented towards the carriage, but is swung out to the top such that it thereby moves out of the path of the carriage. During opening of the sliding roof, the swing-out lever thereby clears the space necessary for shifting the carriage, whereby it is possible that the swing-out lever is arranged in the guideway for the carriage. This provides for a more compact construction in transverse direction with a smaller width of the guide rail.

In one embodiment, it is provided that the guide rail includes a guideway for the carriage and that the swivel axis is located below the guideway. As a result, an advantageous leverage is obtained, with which the necessary forces for swinging out the cover can reliably be applied.

In accordance with one embodiment of the invention a swing-out rod is provided, which can be actuated by the carriage, in order to move the swing-out lever from the starting position into the position swung out, wherein the swing-out rod is guided in the guide rail with its end associated to the swing-out lever. In this way, a particularly precise cooperation of the swing-out rod with the swing-out lever is obtained.

In one embodiment, it is provided that the swing-out rod engages in a coulisse which is provided in the swing-out lever. The coulisse provides for adapting the swing-out movement of the swing-out lever with little effort in the desired way, so that the respectively desired lifting movement of the cover can be adjusted in dependence on the movement of the carriage.

Here, it is particularly advantageous that the coulisse, proceeding from the end of the swing-out lever associated to the cover, initially extends slightly curved towards the guide rail and at the end has an end portion offset in opposite direction. Such course leads to a smooth start of the lifting movement.

In accordance with another embodiment of the invention a cover is provided, which includes a cover holder which is provided with a sliding guideway, wherein at the end of the swing-out lever associated to the cover a slider is mounted, which is accommodated in the sliding guideway of the cover holder. The sliding guideway integrated in the cover holder provides for shifting the cover on opening to the rear with little effort relative to the swing-out lever.

In one embodiment, the cover holder is connected with the guide element located at the front by a swivel bearing, whereby a low-noise, direct transmission of the lifting movement of the guide element to the cover holder is possible.

The shifting movement desired for opening the cover preferably is obtained in that the guide element located at the front can be shifted by the carriage in the guide rail to the rear towards the swing-out lever.

DETAILED DESCRIPTION OF THE DRAWINGS

The invention will be described below with reference to various embodiments which are represented in the attached drawings, in which.

DETAILED DESCRIPTION OF EXEMPLARY EMBODIMENTS

Figure 1:
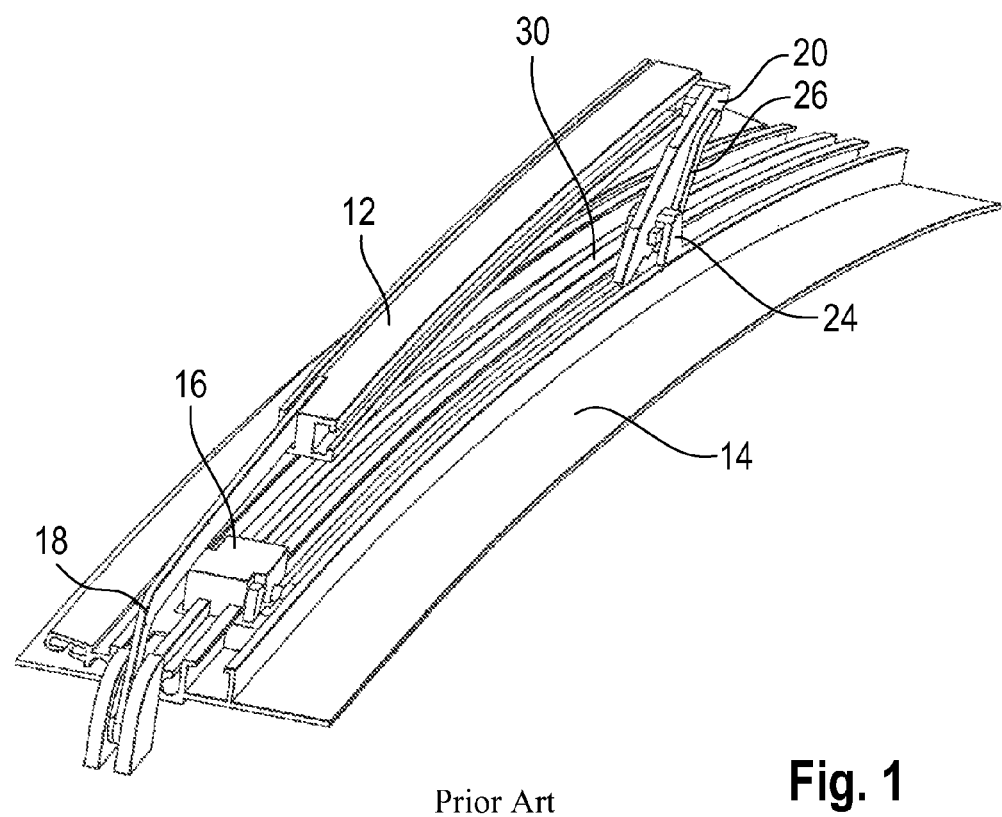
FIG. 1 shows a perspective view of a sliding roof system according to the prior art.
Figure 2:
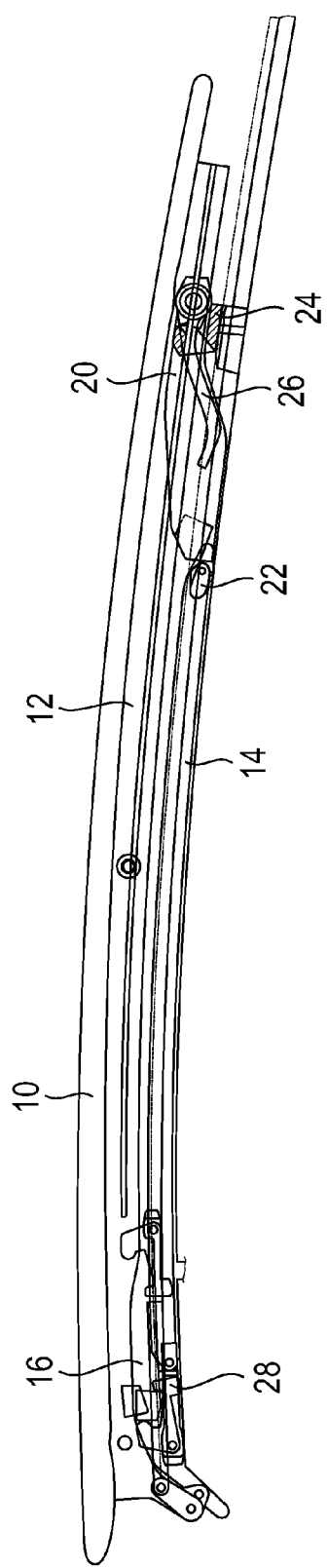
FIG. 2 shows the sliding roof system of FIG. 1 in a condition with closed cover.
Figure 3:
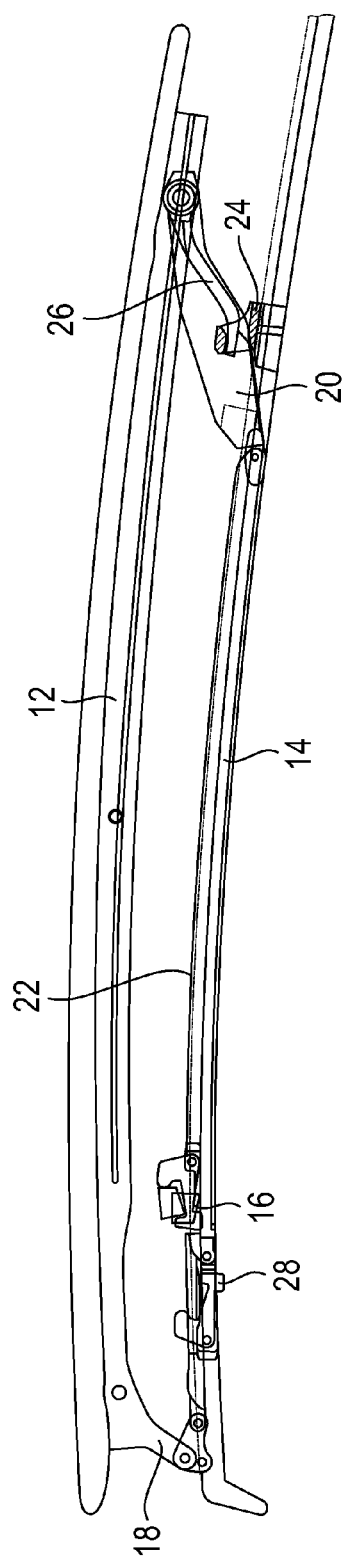
FIG. 3 shows the sliding roof system of FIG. 1 in a condition with the cover swung out to the outside.
Figure 4:
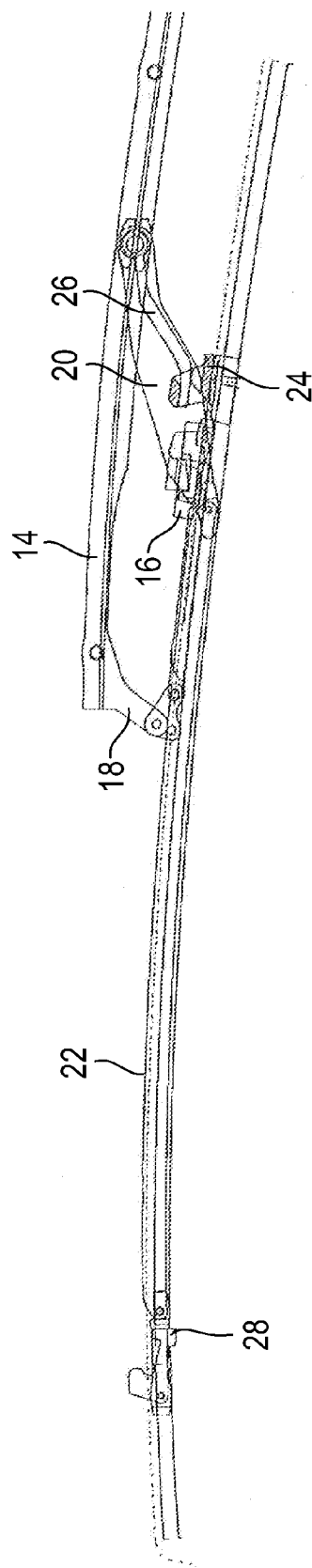
FIG. 4 shows the sliding roof system of FIG. 1 with the cover swung out and shifted to the rear.

With reference to FIGS. 5 to 11, the configuration of the sliding roof system according to the invention will be described below with respect to the swing-out lever 20 located at the rear. For the components which are known from the preceding description of the prior art the same reference numerals are used, and in so far reference is made to the above explanations.

Figure 5:
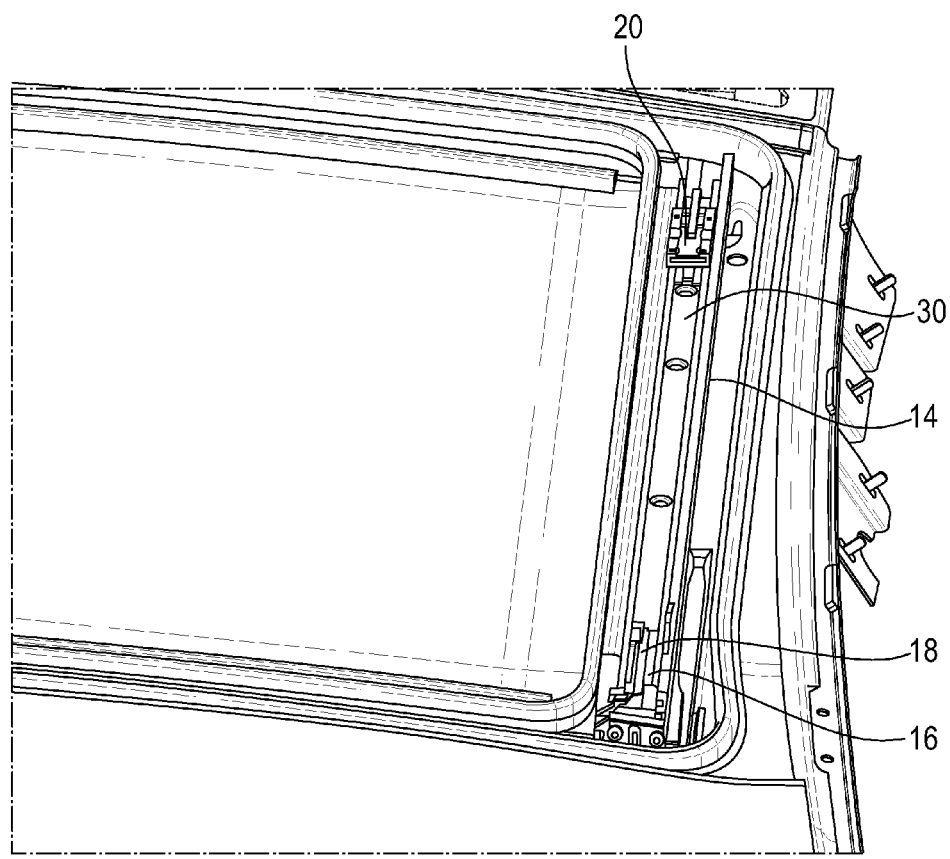
FIG. 5 shows a perspective top view of a sliding roof system according to the invention, wherein the cover and the cover holder are removed.
Figure 11:
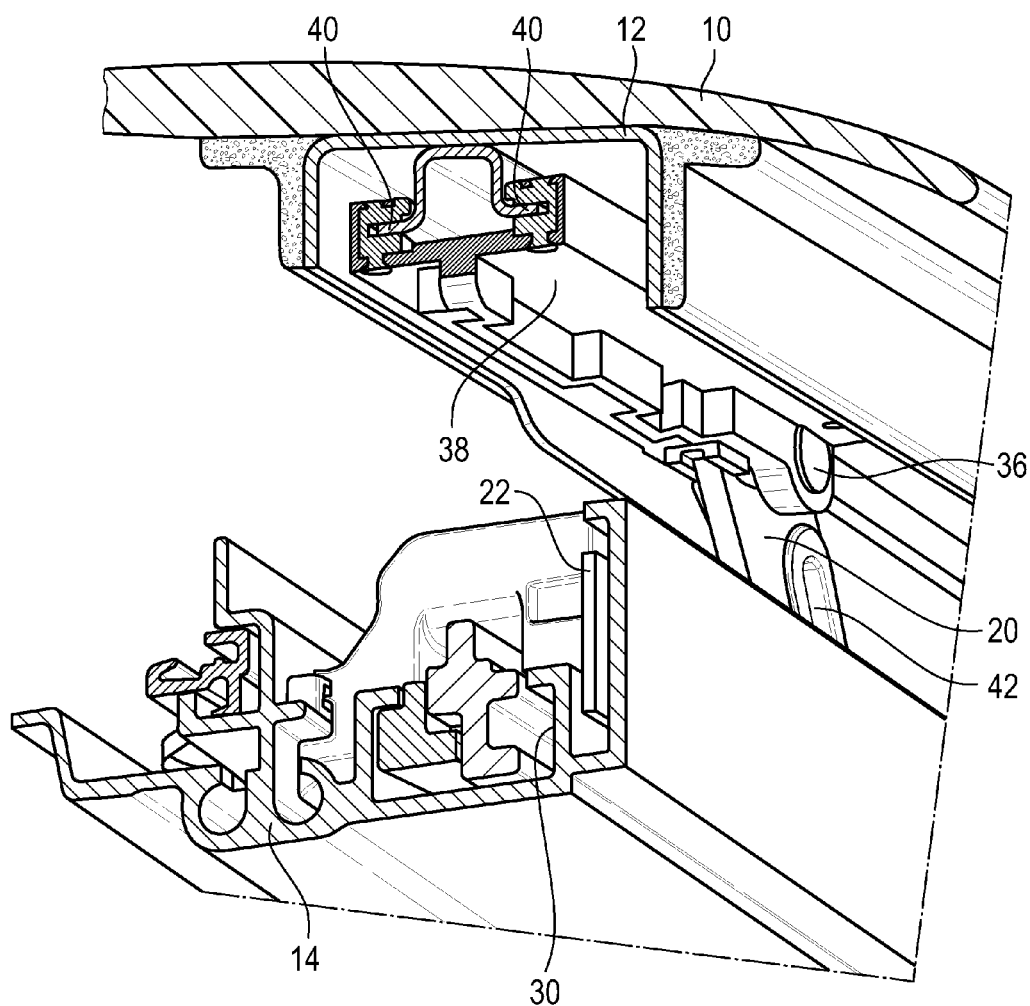
FIG. 11 shows a sectional view of the sliding roof system of FIG. 5 in a condition with the cover fully swung out.

In the sliding roof system according to the invention, the guide rail 41 is designed much more compact in transverse direction, since the carriage 16 and the swing-out lever 20 are arranged in the same guideway 30 (see in particular FIG. 5). The swing-out lever 20 is mounted on the guide rail 14 by a swivel bearing 32 whose swivel axis extends approximately vertical to the longitudinal direction of the guide rail 14 and is formed in the bearing block 24. The same is mounted on the guide rail 14 such that the swivel axis of the swivel bearing 32 lies below the plane of the guide rail 14 (see in particular FIG. 10). For fixing the bearing block 24 on the guide rail 14, connecting pins 34 are provided. As shown in FIG. 11, the swing-out rod 22 is located laterally beside the guideway 30.

The swing-out lever 20 is L-shaped, wherein the short leg of the L points downwards and is connected with the bearing block 24 by means of the swivel bearing 32. In the starting position, the longer arm of the L arranged above the swivel bearing 32 is arranged substantially horizontal and parallel to the guide rail 14. At its free end facing away from the swivel bearing 32, the swing-out lever 20 is connected with a slider 38 by a swivel bearing 36, which slider is shiftably accommodated in a sliding guideway 40 which is mounted on a cover holder 12. In the swing-out lever 20 a coulisse 42 is formed, which is arranged in the longer arm of the L-shaped swing-out lever 20 as a continuous guiding slot. It consists of a longer, substantially uniformly curved portion 42A, whose center of curvature lies on the side of the guide rail, and of a shorter portion 42B, which is comparatively short and is offset with respect to the portion 42A in the opposite direction.

A sliding block 44, which is arranged at the end of the swing-out rod 22 associated to the swing-out lever 20, engages in the coulisse 42. This end of the swing-out rod 22 is provided with a sliding guideway 46, which shiftably engages in suitable guiding formations of the guide rail 14, for example engages around both sides of a horizontal guiding web of the guide rail. In this way, the end of the swing-out rod 22 associated to the swing-out lever 20 is reliably guided in vertical direction.

Figure 6:
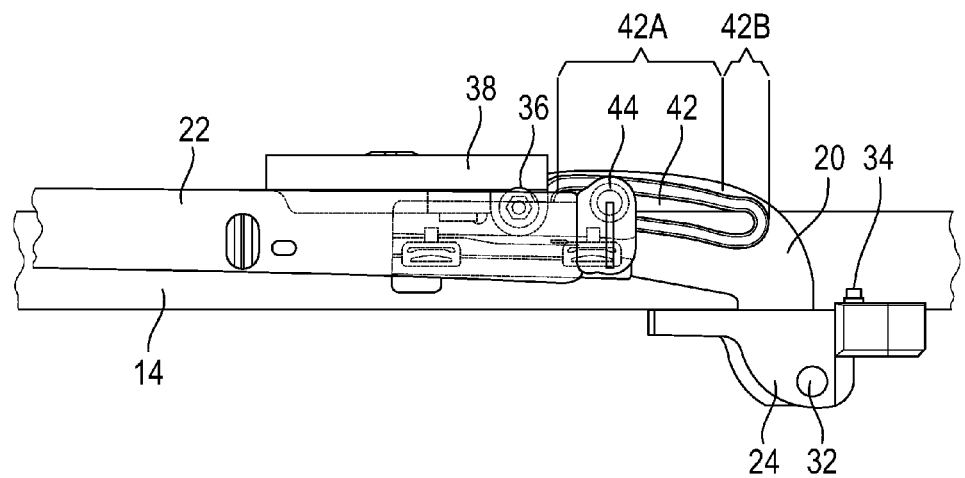
FIG. 6 shows a schematic side view of the swing-out lever of the sliding roof system of FIG. 5 in a condition with closed cover.
Figure 7:
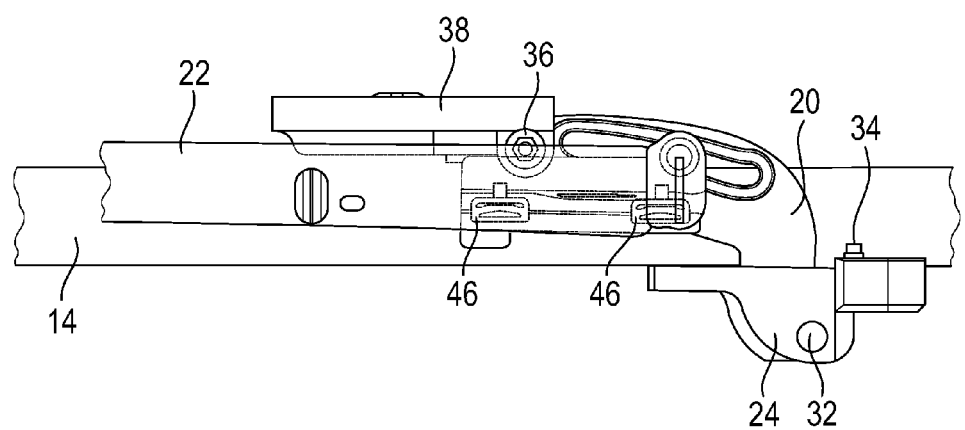
FIG. 7 shows the swing-out lever of FIG. 6 in a condition slightly swung out.
Figure 8:
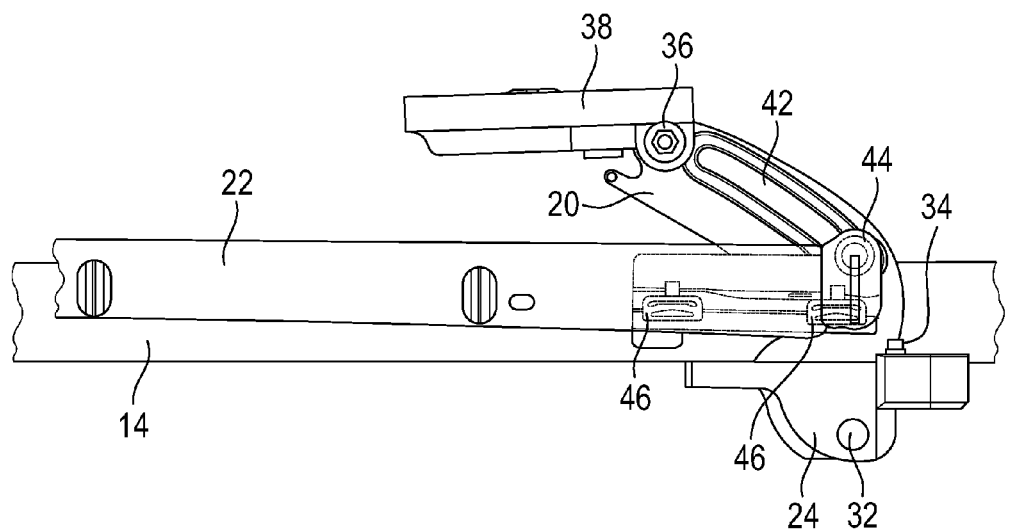
FIG. 8 shows the swing-out lever of FIG. 6 in a condition swung out even further.
Figure 9:
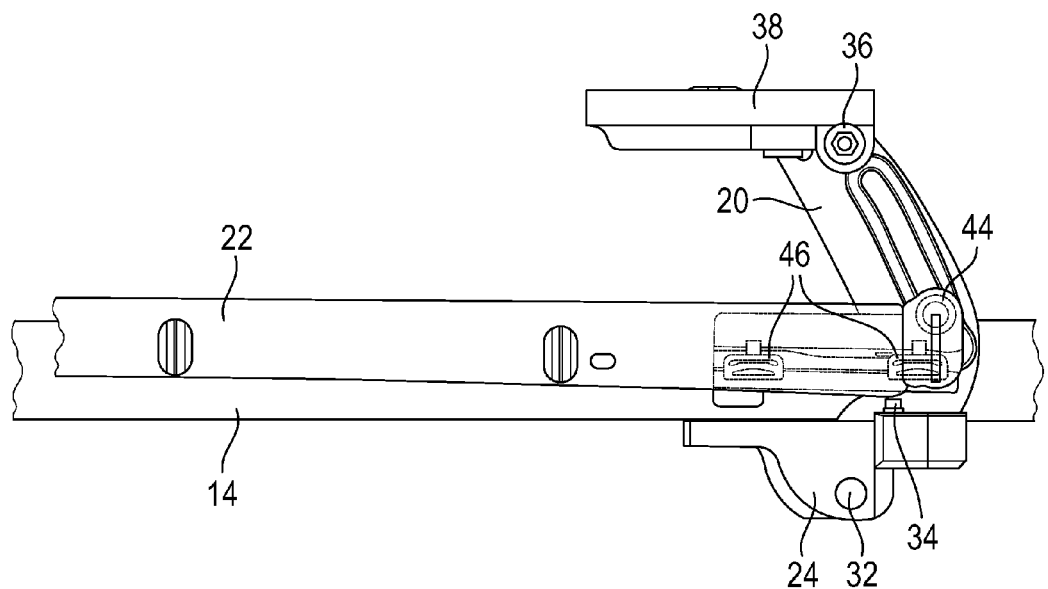
FIG. 9 shows the swing-out lever of FIG. 6 in a condition fully swung out.
Figure 10:
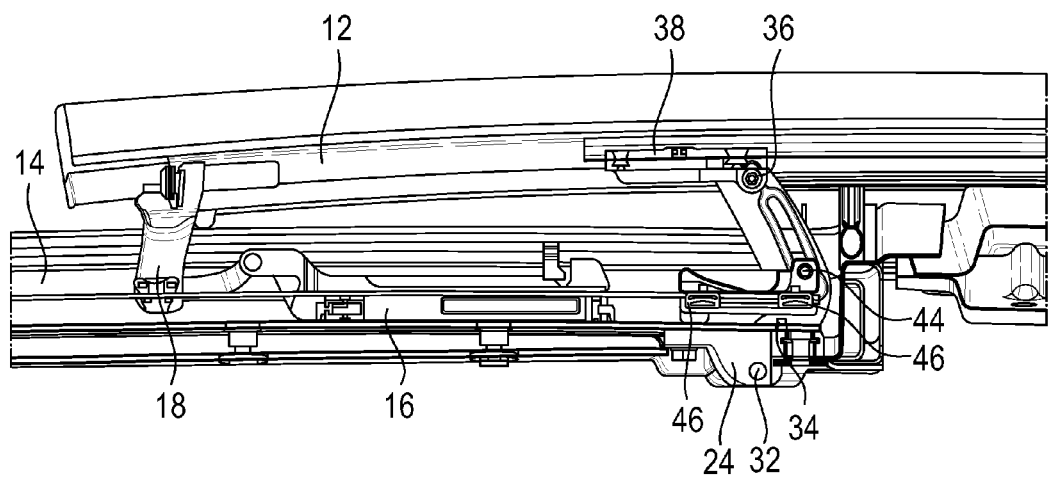
FIG. 10 shows a schematic, cut-away side view of the sliding roof system of FIG. 5 in a condition with the cover fully swung out.

In the starting position, i.e. when the cover 10 is in the closed position in which it closes the opening in the vehicle roof, the swing-out lever 20 is in the position shown in FIG. 6, in which its longer arm extends substantially parallel to the guide rail 14. The end of the swing-out lever 20 provided with the swivel bearing 36, which is associated to the cover 10, is located closer to the carriage 16 than the swivel bearing 32. In other words, the longer arm of the swing-out lever 20 points forwards to the carriage 16. When the carriage is shifted to the rear proceeding from its starting position, it carries along the swing-out rod 22, which with its sliding block 44 is shifted to the rear in the coulisse 42. Due to the curvature of the coulisse 42, the swing-out lever 20 is swiveled about the swivel bearing 32, whereby the swivel bearing 36 is swiveled to the top and to the rear about the swivel bearing 32 on a circular path. FIG. 7 shows a condition with slightly lifted slider 38, and FIG. 8 shows a condition in which the sliding block 44 is maximally shifted to the rear in the coulisse 42. When the swing-out rod 22 is shifted to the rear beyond this point, the swivel movement of the swing-out lever 20 again brings the sliding block 44 into a part of the coulisse 42 located further to the front (see FIG. 9), since the end of the swing-out rod 22 associated to the swing-out lever 20 is guided in the guide rail 14 in vertical direction. As soon as the condition shown in FIG. 9 is reached, in which the swing-out lever 20 is maximally swiveled to the top, the carriage 16 is detached from the front end of the swing-out rod 22 and the same is locked in the guide rail, whereby the swing-out lever 20 is reliably locked in the position swung out.

When the carriage now is shifted further to the rear, it carries along the cover 10 to the rear via the guide element 18, wherein the sliding guideway 40 is shifted relative to the slider 38 which is coupled with the swing-out lever 20. When the cover 10 is maximally opened, the carriage 16 is located at a small distance before the swivel bearing 32 and the region in which the bearing block 24 is arranged. This is possible because the swing-out lever 20 now has cleared this region, which it still has assumed in the starting position, due to its swivel movement to the top.

To again close the cover 10, the carriage 16 is moved to the front. As a result, it initially carries along the guide element 18 to the front, whereby the cover 10 is pulled forwards relative to the swing-out lever 20 swung out. Then, the carriage 16 is again coupled with the swing-out rod 22, so that the same is shifted to the front. As a result, the swing-out lever 20 is again swiveled downwards, so that the rear end of the cover 10 is again moved into its lowered position. In addition, the guide element 18 associated to the front end of the cover is lowered, so that the cover is flush with the vehicle roof and closes the roof opening.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sliding roof system, for motor vehicles, with at least one guide rail, a carriage which is shiftable in the guide rail, a guide element located at the front, which can cooperate with a cover of the sliding roof, and a swing-out lever located at the rear, which likewise can cooperate with the cover and can be moved by the carriage from a starting position into a position swung out, wherein the swing-out lever is mounted on the guide rail with a fixed swivel axis and that at least in the starting position the end of the swing-out lever associated to the cover lies on the side of the swivel axis facing the carriage, wherein a swing-out rod is provided, which can be actuated by the carriage, in order to move the swing-out lever from the starting position into the position swung out, and that the swing-out rod is guided in the guide rail with its end associated to the swing-out lever and wherein the swing-out rod engages in a coulisse which is provided in the swing-out lever.

2. The sliding roof system according to claim 1, wherein the guide rail includes a guideway for the carriage and that the swivel axis lies below the guideway.

3. The sliding roof system according to claim 1, wherein the coulisse, proceeding from the end of the swing-out lever associated to the cover, initially extends slightly curved towards the guide rail and then has an end portion offset in an opposite direction.

4. The sliding roof system according to claim 3, wherein a cover is provided, which includes a cover holder which is provided with a sliding guideway, and that at the end of the swing-out lever associated to the cover a slider is mounted, which is accommodated in the sliding guideway of the cover holder.

5. The sliding roof system according to claim 4, wherein the cover holder is connected with the guide element located at the front by a swivel bearing.

6. The sliding roof system according to claim 5, wherein the guide element located at the front can be shifted by the carriage in the guide rail to the rear towards the swing-out lever.

7. The sliding roof system according to claim 1, wherein a cover is provided, which includes a cover holder which is provided with a sliding guideway, and that at the end of the swing-out lever associated to the cover a slider is mounted, which is accommodated in the sliding guideway of the cover holder.

8. The sliding roof system according to claim 7, wherein the cover holder is connected with the guide element located at the front by a swivel bearing.

9. The sliding roof system according to claim 8, wherein the guide element located at the front can be shifted by the carriage in the guide rail to the rear towards the swing-out lever.

10. The sliding roof system according to claim 1, wherein the guide element located at the front can be shifted by the carriage in the guide rail to the rear towards the swing-out lever.

11. The sliding roof system according to claim 2, wherein the guide element located at the front can be shifted by the carriage in the guide rail to the rear towards the swing-out lever.

12. The sliding roof system according to claim 3, wherein the guide element located at the front can be shifted by the carriage in the guide rail to the rear towards the swing-out lever.

* * * * *